US008115613B2

(12) United States Patent
Patel et al.

(10) Patent No.: US 8,115,613 B2
(45) Date of Patent: Feb. 14, 2012

(54) TIRE PRESSURE MONITORING SYSTEM AUTO LEARN ALGORITHM

(75) Inventors: Dilip B. Patel, Novi, MI (US); Thomas Michael McQuade, Ann Arbor, MI (US); Mohsen Katiba, Wayne, MI (US); Greg Swadling, Milford, MI (US)

(73) Assignee: Ford Global Technologies, Dearborn, MI (US)

( * ) Notice: Subject to any disclaimer, the term of this patent is extended or adjusted under 35 U.S.C. 154(b) by 851 days.

(21) Appl. No.: 12/175,485

(22) Filed: Jul. 18, 2008

(65) Prior Publication Data

US 2010/0013618 A1    Jan. 21, 2010

(51) Int. Cl.
    *B60C 23/00* (2006.01)
(52) U.S. Cl. .............. 340/447; 340/686.1; 340/442; 340/449; 340/539.1; 73/146; 73/146.4
(58) Field of Classification Search .......... 340/447, 340/686.1, 442, 449, 539.1; 701/1; 709/208; 73/146, 146.3
See application file for complete search history.

(56) References Cited

U.S. PATENT DOCUMENTS

| | | | |
|---|---|---|---|
| 4,734,674 A * | 3/1988 | Thomas et al. ............. | 340/447 |
| 5,612,671 A | 3/1997 | Mendez et al. | |
| 6,018,993 A * | 2/2000 | Normann et al. ............ | 73/146.5 |
| 6,218,937 B1 * | 4/2001 | Delaporte ................. | 340/447 |
| 6,622,552 B1 * | 9/2003 | Delaporte ................. | 73/146 |
| 6,731,205 B2 | 5/2004 | Schofield et al. | |
| 6,745,624 B2 | 6/2004 | Porter et al. | |
| 6,864,785 B2 | 3/2005 | Marguet et al. | |
| 6,879,252 B2 | 4/2005 | DeZorzi et al. | |
| 6,967,570 B2 | 11/2005 | Tsuji et al. | |
| 7,010,968 B2 | 3/2006 | Stewart et al. | |
| 7,111,508 B2 | 9/2006 | Desai | |
| 7,173,520 B2 | 2/2007 | Desai et al. | |
| 7,271,709 B2 | 9/2007 | Miller et al. | |
| 2002/0067285 A1 * | 6/2002 | Lill ......................... | 340/870.11 |
| 2003/0156025 A1 * | 8/2003 | Okubo ..................... | 340/447 |
| 2005/0275517 A1 * | 12/2005 | Tsukamoto et al. ......... | 340/442 |
| 2006/0017554 A1 * | 1/2006 | Stewart et al. ............. | 340/447 |
| 2006/0020372 A1 * | 1/2006 | Watabe ..................... | 701/1 |
| 2006/0158324 A1 | 7/2006 | Kramer | |
| 2006/0259214 A1 | 11/2006 | McQuade | |
| 2007/0009028 A1 | 1/2007 | Lee et al. | |
| 2007/0200693 A1 * | 8/2007 | Costes ..................... | 340/447 |
| 2007/0271014 A1 | 11/2007 | Breed | |
| 2010/0148949 A1 * | 6/2010 | McQuade et al. ........... | 340/442 |

* cited by examiner

*Primary Examiner* — Hoi Lau
(74) *Attorney, Agent, or Firm* — Angela M. Brunetti; Fredrick Owens

(57) ABSTRACT

A method of operating a tire pressure monitoring system on a vehicle comprising tracking number of burst transmissions sent by a sensor, building a pareto of potential sensor identifications based on the greatest number of burst transmissions received from the sensor associating a potential sensor identification to a respective tire location on the vehicle and storing the associated sensor identification in memory. A tire pressure monitoring system comprising a plurality of tires in respective locations, each of the plurality of tires having a sensor, at least one sensor capable of burst mode transmission, and an auto learn function in a controller coupled to the sensors in the plurality of tires, the controller receiving and counting burst transmissions from the sensor for a predetermined time, the controller creating a pareto of received sensor identifications, filtering the pareto of potential sensor identifications and assigning the potential sensor identifications to a respective tire in the plurality of tires.

25 Claims, 4 Drawing Sheets

TIRE PRESSURE MONITORING SYSTEM AUTO LEARN ALGORITHM

TECHNICAL FIELD

The inventive subject matter relates generally to a tire pressure monitoring system in an automotive vehicle and more particularly, to an auto learn algorithm for associating a newly installed sensor with a respective tire/wheel on the vehicle to a receiver in the vehicle.

BACKGROUND

Various types of pressure sensing systems for monitoring the pressure within the tires of a vehicle generate a pressure signal using an electromagnetic signal, which is transmitted to a receiver. The pressure signal corresponds to the pressure within a tire. When the tire pressure monitoring system detects a low pressure situation, the vehicle operator is directed to remedy the problem. Such problems are remedied by replacing the low tire with a spare tire, or filling the low tire to increase the pressure therein.

On occasion, new tire pressure monitoring system sensors need to be installed on a vehicle. The sensors need to be associated to a receiver in the vehicle so that the receiver can monitor the correct sensors. Association currently requires manual intervention by a customer or service technician. In the event the new sensor is not properly associated, the receiver will not recognize the sensor and flag a fault, typically in the form of an indicator to the vehicle operator. The fault signal results in customer dissatisfaction and warranty in the field to recognize and repair the problem.

Auto learn functions have been applied to associate the various tire pressure sensor monitors with the locations of the tires in the vehicle. However, many approaches have been known to incorrectly associate a sensor on a vehicle, and may even introduce the potential of incorrectly associating a sensor from a nearby vehicle. There is a need for an accurate auto learn function for associating a newly installed sensor to a receiver on the vehicle that does not require a service technician's initiation.

SUMMARY

A method of operating a tire pressure monitoring system on a vehicle comprising tracking number of burst transmissions sent by a sensor, building a pareto of potential sensor identifications based on the greatest number of burst transmissions received from the sensor associating a potential sensor identification to a respective tire location on the vehicle and storing the associated sensor identification on memory.

A tire pressure monitoring system comprising a plurality of tires in respective locations, each of the plurality of tires having a sensor, at least one sensor capable of burst mode transmission, and an auto learn function in a controller coupled to the sensors in the plurality of tires, the controller receiving and counting burst transmissions from the sensor for a predetermined time, the controller creating a pareto of received sensor identifications, filtering the pareto of potential sensor identifications and assigning the potential sensor identifications to a respective tire in the plurality of tires.

DESCRIPTION OF INVENTION

Figure 1:
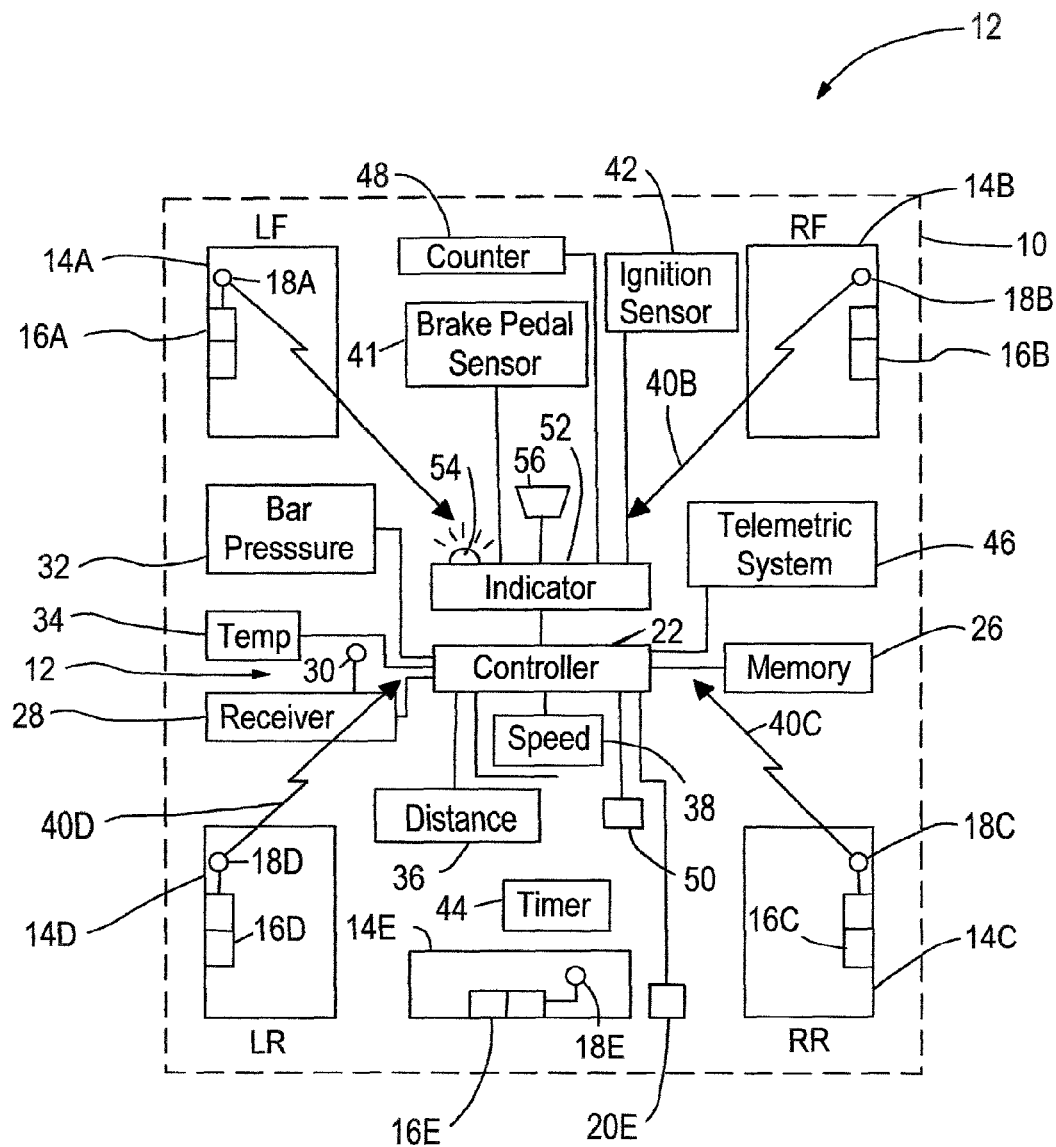
FIG. 1 is a block diagram of a tire pressure monitoring system of the inventive subject matter.

In the following figures, the same reference numbers will be used to illustrate the same components. Those skilled in the art will recognize that the various components set forth herein may be changed without varying from the scope of the invention.

A tire pressure monitoring system 12 is shown for monitoring the air pressure within a left front tire 14A, a right front tire 14B, a right rear tire 14C and a left rear tire 14D. Each tire 14A-14D has a respective tire pressure sensor circuit 16A, 16B, 16C, and 16D. Each sensor circuit 16A-16D has a respective antenna 18A, 18B, 18C and 18D. Each tire is positioned upon a corresponding wheel of a vehicle. Typically, a spare tire 14E is also on the vehicle and may be equipped with a pressure sensor circuit 16E as well as an antenna 18E. While five tires are illustrated herein, it should be noted that the number of tires may be increased as necessary depending on the vehicle. For example, a truck having dual wheels at one or several locations may have more tires than described in the present example.

Controller 22 has a memory 26 associated therewith. Memory 26 may be various types of memory including but not limited to ROM or RAM. Memory 26 is illustrated as a separate component. However, those skilled in the art will recognize controller 22 may have memory 26 incorporated therein. Memory 26 stores various thresholds, calibrations, tire characteristics, wheel characteristics, serial numbers, conversion factors, temperature probes, spare tire operating parameters, and other values needed in the calculation, calibration and operation of the tire pressure monitoring system 12. For example, memory 26 may contain a pareto that includes the sensor identification thereof. Also, any warning statuses of each of the tires may be stored within the memory 26.

Controller 22 is coupled to a receiver 28, which, like memory 26, may also be incorporated into the controller 22. Receiver 28 has an antenna 30 associated therewith. Receiver 30 receives pressure and various information from tire pressure circuits 16A-16E. Controller 22 is also coupled to a plurality of sensors, including but not limited to, barometric pressure sensor 32, an ambient temperature sensor 34, a distance sensor 36, a speed sensor 38, a brake pedal sensor 41, and an ignition sensor 42. Button 50 is used to input information or to reset the controller 22.

A telemetric system 46 may be used to communicate information to and from a central location on a vehicle. For example, the control location may keep track of service intervals and use information to inform the vehicle operator service is required.

A counter 48 is used in the tire pressure monitoring system 12. The counter 48 counts the number of times a particular action is performed. For example, counter 48 may be used to count the number of key-off to key-on transitions for the ignition. And, it should be noted, that the counting function may be inherent in controller 22. According to the inventive subject matter, the counter 48 counts transmissions, i.e., the number of times a sensor transmits, as will be described later herein.

Figure 2:
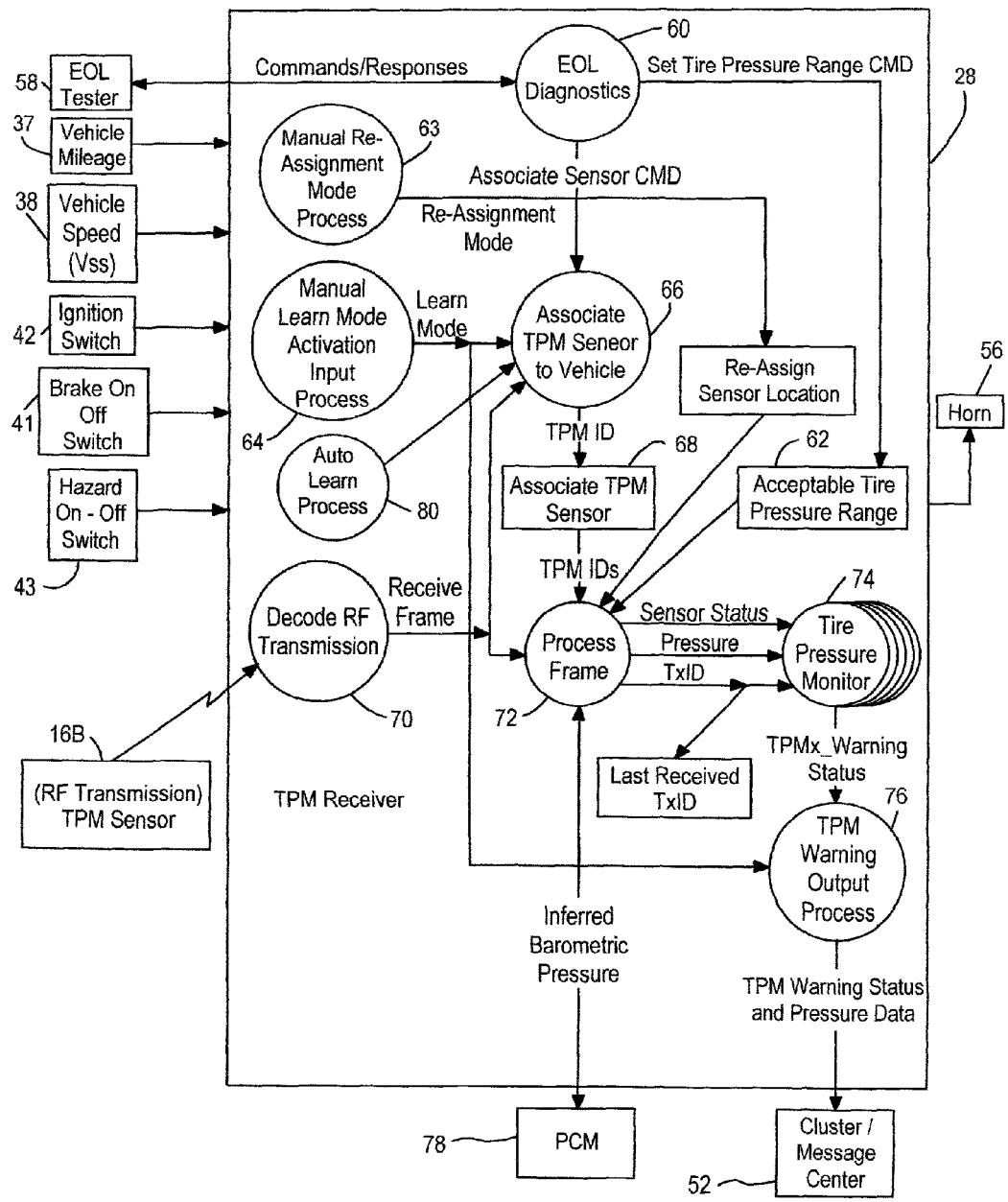
FIG. 2 is a functional flowchart of a tire pressure monitoring system of the inventive subject matter.

Referring now to FIG. 2, functional blocks of the tire pressure monitoring system receiver 28 are shown. Memory stores various ranges for sensor values and thresholds. An end-of-line (EOL) diagnostic block 60 receives test functions from an end-of-line (EOL) tester 58 and provides acceptable pressure ranges 62 and other diagnostic functions to determine faults within the system. The end-of-line tester 58 may also be used in the manufacturing process to store information in memory such as thresholds, tire characteristics, and to initially program the locations corresponding to the vehicle tires. Sensors may include vehicle mileage 37, vehicle speed 38, brake on/off 41, ignition switch 42 and hazard on/off 43.

The sensors 37, 38, 41, 42 and 43 are coupled to a manual reassignment mode process block 63 that allows sensor locations to be reassigned and a manual learn mode activation input process block 64 that allows association block 66 to associate the tire pressure sensors to the locations of the tires on the vehicle in memory block 68. Transmissions from the sensors are decoded in decode block 70, which function may be performed in the receiver. The decoded information is also provided to the association block 66 and to process block 72, which processes the information such as ranges, locations, and current transmission process. In the processing block 72, the sensor status pressure and transmission identifier may be linked to a tire pressure monitor block 74 which is used to provide a warning status to an output block 76. Output block 76 provides information to an external controller 78 as well as an indicator at a cluster/message center 52.

Auto learn block 80 is used to associate the various tire pressure sensor monitors with the locations of the tires in the vehicle. This block may replace or be used in addition to the manual learn block 64 and will be described in detail later herein with reference to FIG. 5, and is used in conjunction with the sensor circuit described herein with reference to FIG. 3.

Figure 3:
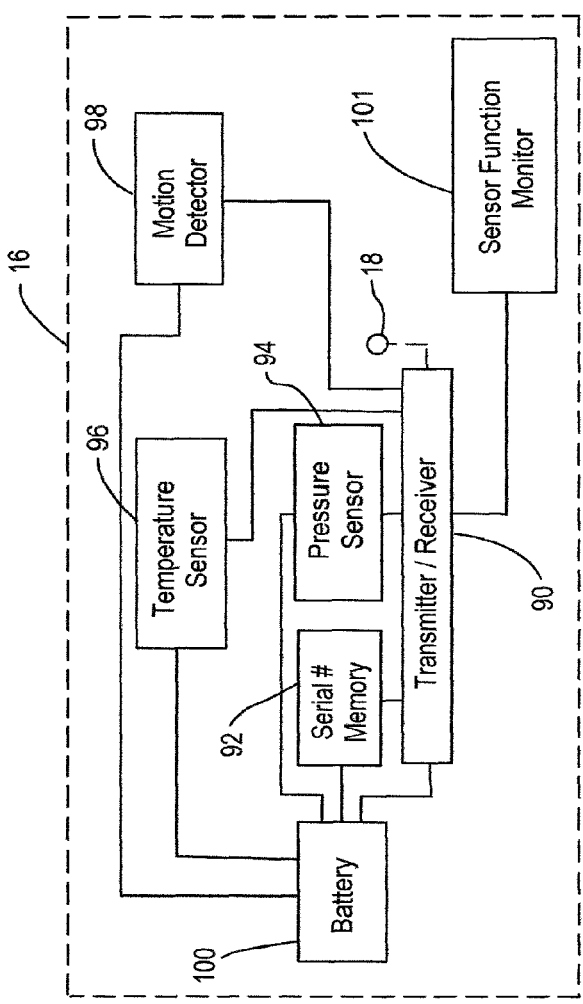
FIG. 3 is a block diagram of a pressure transmitter.

Referring to FIG. 3, a tire pressure sensor circuit 16 of the inventive subject matter is shown. A transmitter/receiver, or transceiver 90, is coupled to the antenna 18 and transmits information to the receiver (not shown in FIG. 3). The pressure sensor may have a serial number memory 92, a pressure sensor 94 for determining the pressure within the tire, a temperature sensor 96, and a motion detector 98 for activating the pressure sensing system.

The transceiver 90, serial number memory 92, pressure sensor 94, temperature sensor 96 and motion sensor 98 are coupled to a battery 100. Battery 100 is preferably a long-life battery capable of lasting through the life of the tire. A sensor function monitor 101 generates an error signal when various portions of the tire pressure circuit are not operating or are operating incorrectly. Sensor function monitor 101 may also generate a signal indicating the system is operating normally.

The transceiver 90 is capable of transmitting in one of two modes; a rotating mode and a stationary mode. In accordance with the inventive subject matter the sensor 16 is configurable and may be implemented to transmit, as required, in burst mode. For purposes of the inventive subject matter herein, as soon as the sensor enters the rotating mode, i.e., motion is detected and the rotating mode bit is set to "1", the sensor 16 enters burst mode. The rotating mode bit is contained in the status bits 110 (see FIG. 4). The burst mode is used by the auto-learn block in order to automatically associate a newly installed sensor with the receiver and is monitored by counts. Each sensor transmits four identical frames for a given transmission.

The sensor 16 remains in burst mode until a predetermined condition has occurred. In the inventive subject matter and tire pressure monitoring system application, if the sensor has transmitted a predetermined number, i.e., thirty-six, of transmissions in the burst mode (the counter starts at zero and ends at thirty-five), the sensor exits burst mode and proceeds to a prospective mode depending on motion detection and other information available to the sensor 16. If the sensor 16 has not completed the predetermined number of transmissions, and the sensor 16 has stopped rotating, the sensor will proceed to an interim mode. Burst transmission is suspended in the interim mode. In the event the sensor starts rotating again before a period set for the interim mode expires, the burst mode will continue from the point it stopped until the predetermined number of transmissions is met. In the event the period for the interim mode expires before the sensor resumes rotation, the burst transmission counter is reset. After the burst transmission counter reaches the predetermined number, the sensor may restart the transmission bursting only if the sensor enters the rotating mode from a stationary mode and not from an interim mode.

Figure 4:
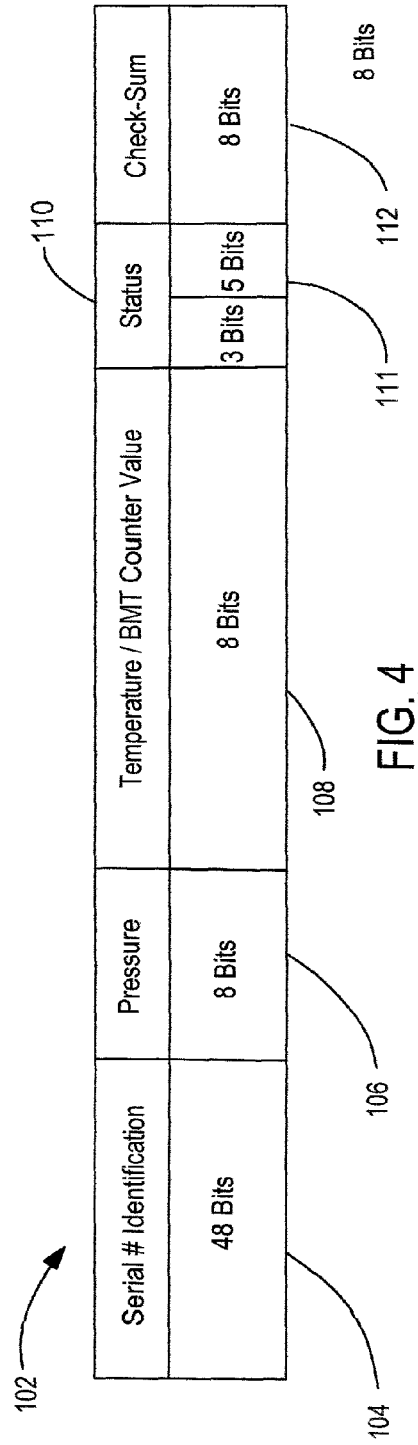
FIG. 4 is diagram of a digital word from a pressure transmitter.

The sensor 16 transmits the counter value with each transmission. Referring now to FIG. 4, a word 102, generated by the tire pressure sensor circuit 16 of FIG. 3 is shown. The word 102 may comprise a transmitter identification serial number portion, hereinafter sensor ID, 104 and a data portion in a predetermined format. For example, the data portion may include a pressure 106, a temperature/counter value 108, a sensor status 110 in which a predetermined number of bits, i.e., five, are dedicated to a factory true setting 111, and a check-sum value 112. Motion detector (not shown in FIG. 4) may initiate transmission of word 102 to the transceiver 90 (also not shown in FIG. 4). The word 102 is preferably configured such that the information may be decoded and validated while providing the identification serial number, the pressure, the temperature and the sensor function. In the present inventive subject matter, during auto learn, the counter value is transmitted in place of the temperature data. The counter value is zero with the two most significant bits set to "ones" for the first transmission. The counter is then increased to the predetermined number of transmissions, with the two most significant bits set to "ones". For example, for 8 bits, when the counter is zero, the sensor transmits "1100 0000" as the burst mode transmission counter value. When the counter value is at its predetermined maximum, i.e., thirty-six transmissions, the counter value is thirty-five and the sensor transmits "1110 0011" as the burst mode transmission counter value.

Figure 5:
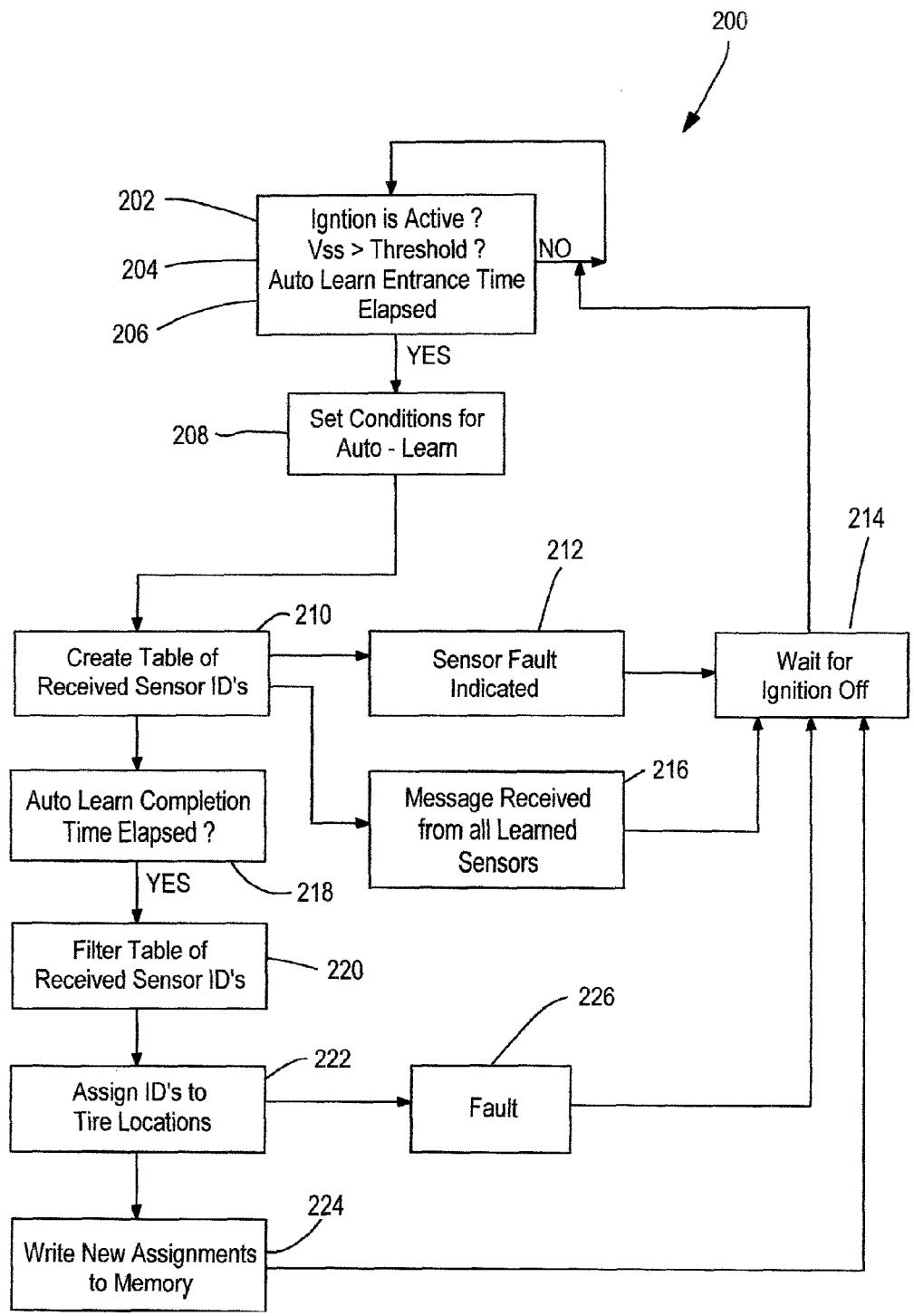
FIG. 5 is logic flow diagram of an auto learn function of the inventive subject matter.

Referring to FIG. 5 there is shown a flow chart of the logic 200 used to perform the auto learn function of the inventive subject matter. The number of sensor identifications to be monitored is configurable. Prior to the auto learn function being initiated, several conditions must be met. The ignition is active 202 while the vehicle speed is higher than a predetermined speed threshold value 204 and the vehicle motion timer is greater than a predetermined value that is representative of a time that the vehicle has been in motion 206. This predetermined value, called an auto learn entrance time, may be calibrated as desired. Upon these conditions being true, the auto learn block is prepared 208 for activation. An auto learn status bit is set to null, a tire pressure monitor streaming mode is set to "true" and the data table of potential sensor identification numbers is cleared.

A pareto, or sorted histogram, is created 210 of all received sensor identifications, i.e., sensor ID's, from words transmitted from the sensors. If any sensor status is at a fault setting, the tire pressure monitoring streaming mode is set to "false" 212 and the system waits 214 for an ignition "off" signal. If at least one word is received with a message from all learned sensor ID's, ID's that are already stored in non-volatile memory, and the rotating mode bit is set to 1, then the auto learn status is confirmed 216, the streaming mode is set to "false", and the system waits for an ignition "off" signal. This is confirmation that the sensor ID's have all been associated with the tires and no further action is required. Each sensor ID stored in memory has been identified and confirmed. It should be noted that the number of ID's monitored in the present example is four. However, this number is configurable and will depend on the number of tires on the vehicle, either in-use or stored as spare.

Once the pareto of received sensor ID's is created, the pareto is filtered 220 into a pareto of potential sensor ID's. Potential ID's are determined according to several parameters. The parameters include a burst counter minimum value requirement B1, a burst counter comparison to learned ID's requirement B2, and a burst counter comparison requirement for all sensors missing B3, are used in the auto learn process to compare the potential sensor ID's and establish assignments. B1 is a value of the six least significant bits of the 8 temperature sensor data bits when the sensor burst mode is true. B2 is a predetermined value representative of a burst counter comparison to the burst counter of the learned ID's. And B3 is a predetermined burst counter comparison if all the sensor ID's are missing.

The sensor ID's having the greatest number of frames received, are compared to the burst counter minimum value requirement B1. For example, potential ID1 will be the sensor ID with the highest number of frames received, potential ID2 will be the sensor ID with the second highest number of frames received, potential ID3 will be the sensor ID with the third highest number of frames received, and potential ID4 will be the sensor ID with the fourth highest number of frames received.

The burst counter of any potential ID's are checked against B2, the burst counters of sensors already associated with the vehicle and stored in non-volatile memory. This step ensures that any newly received sensor ID's are within the B2 counts of sensors that are already on the vehicle and helps protect against incorrectly identifying sensors on another vehicle, such as one located near the subject vehicle. In yet another check that avoids incorrectly identifying sensors of another vehicle is a check that is performed on the status "factory true" setting. This setting is transmitted during the first few drive cycles, such as the first sixteen drive cycles, and is used according to the inventive subject matter to rank the potential ID's.

In the event that at least one, but less than all, of the received sensor ID's have been identified with ID's stored in memory, a check is performed to ensure the auto learn function has been running for a sufficient amount of time to identify potential sensor ID's. In the event the time for vehicle motion has surpassed 218 a predetermined value for an auto learn completion timer, whose value is configurable as desired, the logic 200 will filter 220 the pareto of received identifications based on predetermined requirements to determine potential ID's. As discussed above, the number of sensors may vary with the application and the example in FIG. 5 describes four potential sensor ID's. The potential sensor ID's are identified based on the number of frames received being greater than a predetermined number, configurable as desired, of minimum frames received. Further, the sensor burst counter must meet a minimum threshold requirement, also configurable as desired.

If one or more, (up to three) of the learned ID's in non-volatile memory have been received, then the burst counter of new potential ID's is compared against the average of the burst counter for each of the received ID's. Establishing this value ensures a relevant burst counter comparison for any new potential ID's. If none of the learned ID's in non-volatile memory has been received, then the burst counter of new potential ID's is compared against the predetermined value for the burst counter comparison requirement for all sensors missing, B3. Lastly, if the number of potential ID's received is greater than the number of missing learned sensor ID's, then the normal factory true bit setting, 111 in FIG. 4, is used to rank the relevance of the potential sensor ID's.

The potential sensor ID's are assigned 222 to tire locations in non-volatile memory. There are several possibilities that are addressed depending on how many potential sensor ID's have been associated with ID's currently stored in non-volatile memory. In the first possibility for the example having four sensors, all four sensor ID's currently stored in non-volatile memory have not been received and four potential sensor ID's exist in the filtered pareto. In this possibility each potential ID is assigned to one of the tire locations and stored 224 in non-volatile memory. Auto learn status is confirmed and any faults, warnings, etc. for each of the four tire locations are cleared.

In another possibility, less than all the sensor ID's currently stored in non-volatile memory may be received. Any missing sensor ID's are assigned 222 to the tire locations that do not have sensor ID's assigned thereto and the new ID assignments are written 224 to non-volatile memory. Finally, in the event no requirements are met, an auto learn status fault is set 226.

The inventive subject matter automatically associates each new tire pressure monitoring system sensor to a receiver by way of an automatic process without the need for operator intervention. The algorithm takes several factors into consideration to make the determination that a new sensor has been installed, including, but not limited to vehicle speed, ignition status, time elapsed at speed, number of sensor frames received, and sensor burst data. The burst counter, that keeps track of the number of burst transmissions sent by a sensor when it enters a "rotating" state from a "stationary" state, minimizes the potential of incorrectly associating a sensor from a nearby vehicle, thereby minimizing the potential for subsequent faults and error messages.

While particular embodiments of the inventive subject matter have been shown and described, numerous variations and alternate embodiments will occur to those skilled in the art. Accordingly it is intended that the invention be limited only in terms of the appended claims.

What is claimed is:

1. A method of operating a tire pressure monitoring system on a vehicle comprising:
   receiving transmissions at the tire pressure monitoring system from at least one tire pressure sensor, the transmissions including at least a sensor identification and a counter value;
   tracking a number of frames transmitted by at least one sensor;
   tracking a number of burst transmissions sent by the at least one sensor;
   building a pareto of potential sensor identifications based on the greatest number of frames received from the at least one sensor;
   comparing the number of burst transmissions sent by the at least one sensor in the pareto of potential sensor identifications to a predetermined burst minimum value to determine a relevant potential sensor identification;
   associating a relevant potential sensor identification to a respective tire location on the vehicle; and
   storing the associated sensor identification in memory.

2. The method as claimed in claim 1 wherein the step of building a pareto of potential sensor identifications further comprises the step of confirming an active ignition status of a vehicle.

3. The method as claimed in claim 2 wherein the step of building a pareto of potential sensor identifications further comprises the step of verifying a vehicle speed has met a predetermined speed threshold.

4. The method as claimed in claim 3 wherein the step of building a pareto of potential sensor confirming that a predetermined amount of time has elapsed at the verified vehicle speed.

5. The method as claimed in claim 1 wherein the step of building a pareto of potential sensor identifications further comprises the step of:
calculating a number of frames received from a sensor from the number of tracked burst transmissions; and
comparing the calculated number of frames received to a predetermined number of frames to ensure each potential sensor identification has been included in the pareto.

6. The method as claimed in claim 5 wherein the step of building a pareto of potential sensor identifications further comprises the step of filtering potential sensor identifications based on the number of frames received from a sensor, whereby a potential sensor identification is determined for each sensor in a descending order of the number of frames received.

7. The method as claimed in claim 6 wherein the step of filtering potential sensor identifications further comprises:
comparing a received sensor burst counter to a predetermined burst counter minimum requirement to verify all sensor identifications have been received; and
selecting a comparison threshold value based on the number of known sensor identifications received.

8. The method as claimed in claim 7 wherein the step of selecting a comparison threshold based on the number of known sensor identifications received further comprises setting the comparison threshold to a value equal to an average of the burst counter values for the known sensor identifications plus or minus a predetermined threshold when at least one known sensor identification has been received.

9. The method as claimed in claim 7 wherein the step of selecting a comparison threshold further comprises setting the comparison threshold to a value equal to an average of the burst counter values for all of the new received identifications plus or minus a predetermined threshold value associated with none of the known sensor identifications having been received.

10. The method as claimed in claim 7 wherein the number of potential sensor identifications is greater than the number of missing sensor identifications and further comprising the step of identifying a factory true setting to determined actual potential sensor identifications.

11. A tire pressure monitoring system comprising:
a plurality of tires in respective locations, each of the plurality of tires having a sensor transmitting at least a sensor identification and a counter value;
at least one sensor in the plurality of tires capable of burst mode transmission; and
an auto learn function in a controller coupled to the sensors in the plurality of tires, the controller receiving and counting burst transmissions from the at least one sensor for a predetermined time, the controller creating a pareto of received sensor identifications, filtering the pareto of potential sensor identifications and assigning the potential sensor identifications to a respective tire in the plurality of tires.

12. The system claimed in claim 11 further comprising:
a signal indicating an active ignition;
a predetermined vehicle speed threshold; and
a predetermined time limit for maintaining the predetermined vehicle speed threshold after ignition is active to initiate the auto-learn function.

13. The system as claimed in claim 11 wherein the pareto of received sensor identifications further comprises at least one received sensor identification currently associated with a respective tire location being confirmed in memory and whereby each received sensor identification not currently associated with a respective tire location is stored as a potential sensor identification.

14. The system as claimed in claim 13 wherein the filtered pareto of potential sensor identifications is created from the pareto of potential sensor identifications and is based on sensor identifications with a number of burst transmissions received from the sensor, whereby the sensors transmitting the number of burst transmissions in comparison to a predetermined value representative of a burst counter of learned identifications are stored as potential identifications to be assigned to a respective tire location.

15. The system as claimed in claim 14 further comprising:
a comparison threshold set to a value calculated from an average of the burst counter values for any known sensor identifications stored in memory plus or minus a predetermined threshold used in the event at least one known sensor identification has been received.

16. The system as claimed in claim 14 further comprising:
a comparison threshold set to a value calculated from an average of the burst counter values for all newly received sensor identifications plus or minus a predetermined threshold used in the event none of the known sensor identifications has been received.

17. The system as claimed in claim 14 wherein the number of potential sensor identifications exceeds a number of missing sensor identifications and the potential sensor identifications are limited by identifying a factory true setting in the sensor.

18. The system as claimed in claim 14 wherein any potential sensor identification not currently associated with a respective location is assigned to a respective tire location.

19. A method of operating a tire pressure monitoring system on a vehicle comprising:
receiving transmissions at the tire pressure monitoring system from at least one tire pressure sensor, the transmissions including at least a sensor identification and a counter value;
tracking a number of burst transmissions sent by at least one sensor;
building a pareto of received sensor identifications based on the tracked burst transmissions;
filtering the pareto of received sensor identifications through comparisons with predetermined burst transmission count values thereby defining a pareto of potential sensor identifications;
associating a potential sensor identification to a respective tire location on the vehicle; and
storing the associated sensor identification in memory.

20. The method as claimed in claim 19 wherein the step of building a pareto of potential sensor identifications further comprises the step of:
calculating a number of frames received from a sensor from the number of burst transmissions in a burst counter; and comparing the number of frames received to a predetermined number of frames to ensure each potential sensor identification has been included in the pareto.

21. The method as claimed in claim 20 wherein the step of building a pareto of potential sensor identifications further comprises the step of filtering potential sensor identifications based on the number of frames received from a sensor, whereby a potential sensor identification is made for each sensor having the greatest number of frames received in a descending order.

22. The method as claimed in claim 21 wherein the step of building a pareto of potential sensor identifications further comprises:

comparing a burst counter value of a potential sensor identification to an average of the burst counter values received for each known sensor identification plus or minus a first predetermined threshold value, the first predetermined threshold value being set in the event at least one known sensor identification has been received;

comparing a burst counter value of a potential sensor identification to an average of newly received but unknown sensor identification burst counter values for received sensor identifications plus or minus a second predetermined threshold value, the second predetermined threshold value being set in the event none of the known sensor identifications has been received; and looking for a factory true setting on a received sensor identification to determined potential sensor identifications in the event more than a missing number of learned sensor identifications has been received.

23. The method as claimed in claim 22 wherein the step of building a pareto of received sensor identifications further comprises the step of confirming an active ignition status of a vehicle.

24. The method as claimed in claim 23 wherein the step of building a pareto of received sensor identifications further comprises the step of verifying a vehicle speed has met a predetermined speed threshold.

25. The method as claimed in claim 24 wherein the step of building a pareto of received sensor identifications further comprises the step of confirming a predetermined amount of time has elapsed at the vehicle speed threshold.

* * * * *